(12) United States Patent
Oakley, Jr.

(10) Patent No.: US 12,040,742 B2
(45) Date of Patent: Jul. 16, 2024

(54) SCALABLE SOLAR MODULAR ARRAY

(71) Applicant: Gary William Oakley, Jr., Woodstock, NY (US)

(72) Inventor: Gary William Oakley, Jr., Woodstock, NY (US)

(73) Assignee: XPLOR LLC, Woodstock, NY (US)

( * ) Notice: Subject to any disclaimer, the term of this patent is extended or adjusted under 35 U.S.C. 154(b) by 341 days.

(21) Appl. No.: 16/544,307

(22) Filed: Aug. 19, 2019

(65) Prior Publication Data

US 2021/0058027 A1  Feb. 25, 2021

Related U.S. Application Data

(60) Provisional application No. 62/848,292, filed on May 15, 2019.

(51) Int. Cl.
| | | |
|---|---|---|
| *H02S 40/34* | (2014.01) | |
| *H02J 7/00* | (2006.01) | |
| *H02J 7/35* | (2006.01) | |
| *H02S 20/30* | (2014.01) | |
| *H02S 30/20* | (2014.01) | |
| *H02S 40/36* | (2014.01) | |

(52) U.S. Cl.
CPC ............ *H02S 40/34* (2014.12); *H02J 7/0045* (2013.01); *H02J 7/007* (2013.01); *H02J 7/35* (2013.01); *H02S 20/30* (2014.12); *H02S 30/20* (2014.12); *H02S 40/36* (2014.12)

(58) Field of Classification Search
CPC .......... H02S 10/40; H02S 40/36; H02S 30/20; H02S 40/34; H02S 20/30; H02J 7/007; H01M 10/44; Y02E 10/50; Y02E 60/10

USPC ......................................................... 320/101
See application file for complete search history.

(56) References Cited

U.S. PATENT DOCUMENTS

| | | |
|---|---|---|
| 4,821,192 A | 4/1989 | Taivalkoski et al. |
| 4,827,534 A | 5/1989 | Haugen |
| (Continued) | | |

FOREIGN PATENT DOCUMENTS

| | | |
|---|---|---|
| CN | 1041984 C | 2/1999 |
| CN | 205647338 U | 10/2016 |
| (Continued) | | |

OTHER PUBLICATIONS

Notification of Transmittal of the International Search Report and the Written Opinion of the International Searching Authority, of the Declaration; Mailing Date Sep. 4, 2020; PCT/US2020/32782; 32 pages.

*Primary Examiner* — David V Henze-Gongola
(74) *Attorney, Agent, or Firm* — Schmeiser, Olsen & Watts, LLP (57) ABSTRACT

A scalable solar module array includes a first module electrically coupled to a second module. The first and second module each include a solar panel to collect solar radiation, one or more receptacles located on the solar panel, wherein the one or more receptacles are configured to accept a charging cable for an electronic device, and a mounting member. The first and second modules are electrically coupled through a detachable cable, the cable being connected to a receptacle of the first module and a receptacle of the second module. The one or more receptacles may also be configured to accept a charging cable of an electronic device.

20 Claims, 7 Drawing Sheets

(56) References Cited

U.S. PATENT DOCUMENTS

| | | | |
|---|---|---|---|
| 8,046,961 B1 * | 11/2011 | Cutting | H02S 10/40 |
| | | | 52/173.3 |
| 8,080,972 B2 | 12/2011 | Smith | |
| D664,499 S | 7/2012 | Workman et al. | |
| 8,416,130 B2 | 4/2013 | Scherzinger | |
| D693,765 S | 11/2013 | Workman et al. | |
| 8,674,211 B1 | 3/2014 | Palmer et al. | |
| 8,738,238 B2 | 5/2014 | Rekow | |
| 8,768,558 B2 | 7/2014 | Reeve et al. | |
| 9,006,940 B2 | 4/2015 | Korman | |
| 9,362,766 B2 | 6/2016 | Workman et al. | |
| 9,499,197 B2 | 11/2016 | Tan et al. | |
| 9,581,443 B2 | 2/2017 | Gil | |
| 9,740,209 B2 | 8/2017 | Nakano et al. | |
| 9,758,239 B2 | 9/2017 | Metzler et al. | |
| 10,250,068 B2 | 4/2019 | Oakley, Jr. | |
| 2005/0140331 A1 * | 6/2005 | McQuade | H02J 7/35 |
| | | | 320/101 |
| 2006/0225781 A1 * | 10/2006 | Locher | H02S 40/38 |
| | | | 136/245 |
| 2010/0043781 A1 * | 2/2010 | Jones | F24S 25/16 |
| | | | 126/704 |
| 2011/0049992 A1 * | 3/2011 | Sant'Anselmo | H02S 10/12 |
| | | | 307/64 |
| 2011/0062888 A1 * | 3/2011 | Bondy | H05B 45/3725 |
| | | | 315/294 |
| 2012/0270450 A1 * | 10/2012 | Leonhard | H02S 40/34 |
| | | | 439/680 |
| 2012/0285502 A1 * | 11/2012 | Philipp | H01L 31/05 |
| | | | 136/244 |
| 2012/0313567 A1 * | 12/2012 | Ichikawa | H02J 7/35 |
| | | | 320/101 |
| 2013/0043826 A1 | 2/2013 | Workman et al. | |
| 2013/0076078 A1 * | 3/2013 | Ramdeo | B60J 7/043 |
| | | | 136/251 |
| 2013/0102191 A1 * | 4/2013 | Feye-Hohmann | H01R 24/28 |
| | | | 439/583 |
| 2013/0169054 A1 | 7/2013 | Patrick | |
| 2013/0293183 A1 | 11/2013 | Oakley, Jr. | |
| 2014/0061273 A1 * | 3/2014 | Bullivant | A45F 3/04 |
| | | | 224/576 |
| 2014/0378853 A1 * | 12/2014 | McKinney | A61B 5/02438 |
| | | | 600/509 |
| 2015/0129021 A1 | 5/2015 | Cinnamon et al. | |
| 2016/0013642 A1 | 1/2016 | Linderman | |
| 2016/0226305 A1 * | 8/2016 | Estes | H02J 9/062 |
| 2016/0329858 A1 * | 11/2016 | Stoddard | H02S 20/20 |
| 2017/0077864 A1 * | 3/2017 | Goodman | F24S 25/70 |
| 2017/0109978 A1 * | 4/2017 | Thiel | H02S 40/36 |
| 2017/0294803 A1 | 10/2017 | Langlois et al. | |
| 2017/0353150 A1 * | 12/2017 | Alon | H02G 3/16 |
| 2017/0366136 A1 * | 12/2017 | Feldmann | H01R 24/30 |
| 2018/0041161 A1 * | 2/2018 | Goldberg | F24S 25/67 |
| 2018/0302029 A1 | 10/2018 | Hall et al. | |
| 2018/0342976 A1 | 11/2018 | Pederson et al. | |
| 2018/0366789 A1 * | 12/2018 | Petrella | H02S 40/30 |

FOREIGN PATENT DOCUMENTS

| | | |
|---|---|---|
| CN | 205791677 U | 12/2016 |
| CN | 106787112 | 5/2017 |
| CN | 108269872 A | 7/2018 |
| EP | 2169498 B1 | 11/2015 |
| EP | 3271784 B1 | 12/2020 |
| IN | 107976999 B | 11/2020 |
| WO | 2019086454 A1 | 5/2019 |

* cited by examiner

SCALABLE SOLAR MODULAR ARRAY

CROSS-REFERENCE TO RELATED APPLICATIONS

This application claims priority to provisional application 62/848,292, having a filing date of May 15, 2019, the entire contents of which are hereby incorporated by reference.

FIELD OF TECHNOLOGY

The following relates generally to a solar powered array unit. More specifically, the following relates to a scalable, modular solar powered array unit.

BACKGROUND

Electronic devices typically operate with the use of a rechargeable battery to power the electronic device. To recharge the battery, an electrical current is applied to the battery to electrically reverse the electrochemical reactions that previously generated electricity, for future conversion into electricity. Traditionally, the most prevalent source of electricity is alternating current (AC) electricity. An electronic device is generally charged by converting the AC electricity into direct current (DC) electricity, which is applied to the battery as explained above. For instance, a charger can connect an electronic device to a wall receptacle delivering AC electricity to the electronic device wherein the AC electricity is converted to DC electricity and thereby charges the battery.

Although plugging an electronic device into an AC power source is sufficient to charge a battery of an electronic device, an AC power source is not always available. For example, a user stranded or simply working in the field with no means of generating sustainable electricity cannot simply plug the device into a cable charger connected to a wall receptacle. Without a conventional AC power source to recharge the battery, the electronic device will eventually fail. For example, users often utilize a vehicle's electrical system to charge electronic devices. However, when the vehicle is turned off, parked, or the battery dies, there is no source of electricity present within the vehicle. Moreover, consumption of the electricity and electricity generation can be harmful to the environment. Additionally, the cost of electricity from conventional sources, such as oil, gas, or coal, is high and continually rising.

One possible solution to the problems discussed above is solar energy. Solar panels allow a user to convert light from the sun into electricity. The photovoltaic cells of solar panels produce DC electricity, which can be harnessed to provide power for a number of applications. Solar panels may be large enough to power homes or entire buildings; however, these solar panels are fixed in place and too large to move. Additionally, smaller solar panels which a user may bring to locations with no means of generating sustainable electricity do not generate sufficient electrical energy for certain higher-load applications. As such, a user who requires extended periods of electricity or needs electricity for several applications or a single higher-load application would not be served by present solutions.

People, now more than ever, are constantly on the move. Additionally, people want to remain connected to the rest of the world through electronic devices such as cell phones or laptops. However, these electronic devices often run out of battery life quickly, often when not near any power source. Solar technology allows for the possibility that where there is sunlight, there is a potential charging source available for electronic devices. This allows for people to explore, travel, create content, and remain connected without the risk of their electronic devices dying.

Moreover, the smaller solar panels presently available are not customizable in their size or the amount of energy they provide, leaving users to choose between transporting a larger solar panel or a plurality of smaller solar panels depending on the anticipated applications. This is problematic as it is often difficult for users to predict the amount of electricity they may require, or when they may require it, when traveling to areas without means of generating sustainable electricity. Additionally, it requires users to purchase a number of different solar powered units to cover all of their possible needs.

Thus, an apparatus and method for providing a scalable, modular solar array addressing the problems discussed above would be well received in the art.

SUMMARY

According to one embodiment, A scalable solar module array comprises a first module electrically coupled to a second module, wherein the first and second module each include: a solar panel to collect solar radiation; one or more receptacles located on the solar panel, wherein the one or more receptacles are configured to accept a charging cable for an electronic device; and a mounting member. The first and second modules are electrically coupled through a detachable cable, the cable being connected to a receptacle of the first module and a receptacle of the second module.

According to another embodiment, a solar array comprises a first solar panel, the first solar panel having one or more photovoltaic cells on a first side and a mounting member on a second side, wherein the first solar panel includes a plurality of receptacles configured for establishing an electrical connection with an electronic device; a second solar panel, the second solar panel having one or more photovoltaic cells on a first side and a mounting member on a second side, wherein the second solar panel includes a plurality of receptacles configured for establishing an electrical connection with an electronic device; and a cable for supporting the flow of current. The cable is plugged in to a receptacle of the first solar panel and a receptacle of the second solar panel such that electrical energy produced by one solar panel can flow to the other solar panel such that the flow of current from the first and second solar panels is combined According to another embodiment, a method of charging an electronic device comprises connecting a first solar panel to a second solar panel using a detachable cable at receptacles located on the first and second solar panels; collecting solar radiation with the first solar panel; collecting solar radiation with the second solar panel; transferring the flow of current from the second solar panel to the first solar panel using the detachable cable; combining the flow of current from the first and second solar panels; regulating the flow of current from the first and second solar panels through a charge controller; and transferring electrical energy produced by the first and second solar panels to an electronic device which is electrically coupled to the first solar panel.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

In the figures, like numbers refer to like objects throughout. Objects in the diagrams are not necessarily drawn to scale.

DETAILED DESCRIPTION

A detailed description of the hereinafter described embodiments of the disclosed apparatus and method are presented herein by way of exemplification and not limitation with reference to the Figures.

Figure 1:
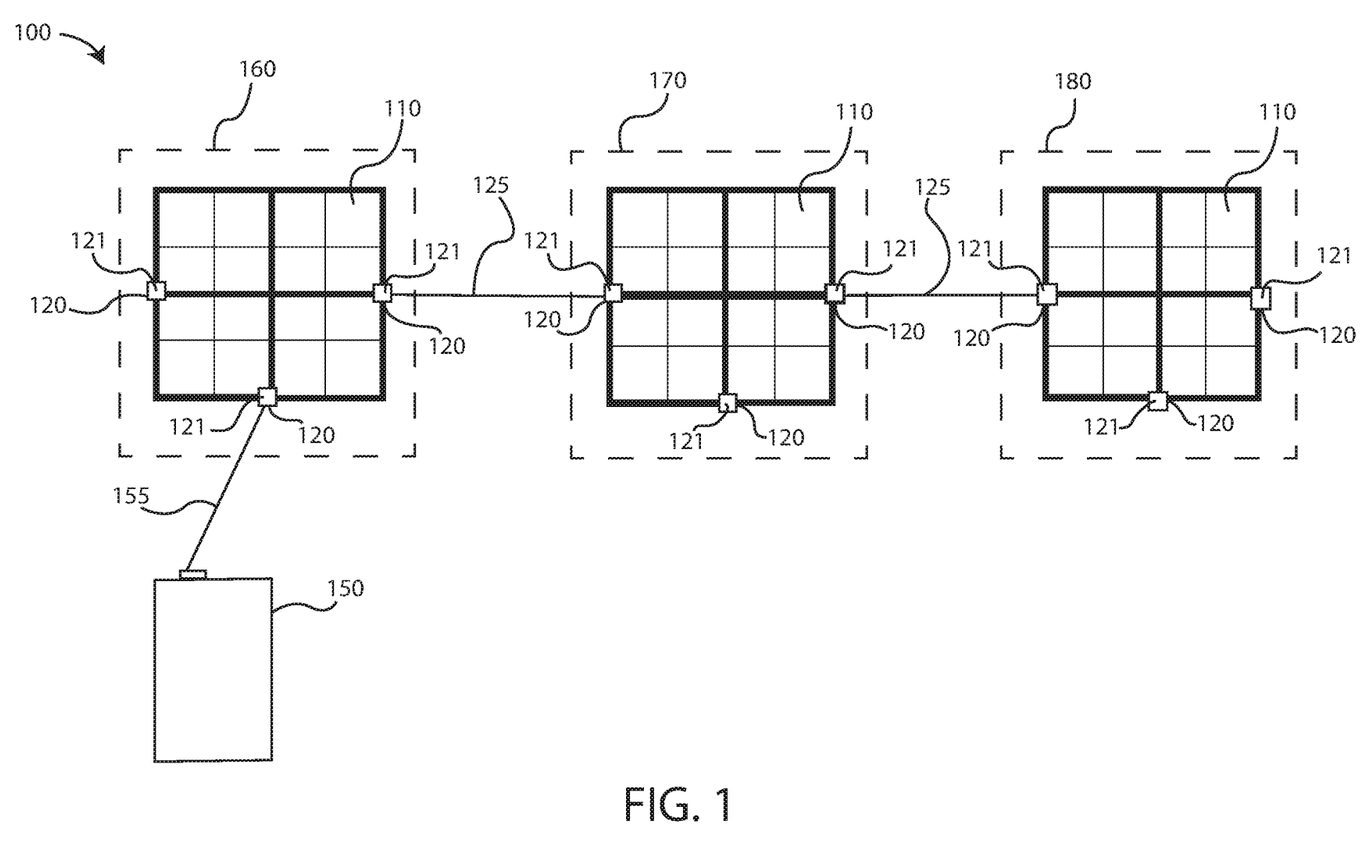
FIG. 1 depicts a front view of an embodiment of a scalable solar module array.

Referring to the drawings, FIG. 1 depicts a front view of an embodiment of a scalable solar module array 100. The scalable solar module array 100 includes a plurality of solar panels 110. Each solar panel 110 may be comprised of one or more photovoltaic cells. The solar panels 110 may be composed of several layers, wherein each layer may be a structural or load carrying layer, reflective layer, absorbing layer, cooling layer, photoactive layer, etc. The structural layer may be made of glass or other materials meeting structural requirement, transparency requirements, cost requirements, manufacturing requirements, and other requirements known to those having skill in the art. Additionally, the structural layer may be flexible or rigid. The photoactive layer may be composed of materials such as semiconductors that show photoactivity and may be associated with the structural layer by various methods such as laying or deposition on the structural layers forming photovoltaic units. Photoactive materials may be amorphous or crystalline, mono or poly crystalline structures, and/or elements or compounds including, but not limited to, silicon, cadmium, halogens, mercury, zinc, iridium, tellurium, copper, gold, silver, gallium, arsenides, selenium, organic or polymer materials, and/or a combination thereof. The solar panels 110 may include different kinds of photovoltaic cells. For example, the photovoltaic cells may be rigid, flexible, thin film, bulk cell, etc., and can be produced by changing the method of association with the structural layer.

Accordingly, the photovoltaic cells of each solar panel 110 may be interconnected by various methods in series or parallel to meet voltage and/or current requirements. Connection between photovoltaic cells may be achieved by using a perimeter connector, a conductive grid on the upper and/or lower surface of the photoactive layer or by a thin layer of conductive material. The connections may be a positive type and a negative type depending on the type of photoactive material connected by the connection. If a positive type connection is connected to another positive type connection, it results in a parallel connection. Likewise, if a negative type connection is connected to another negative type connection, it results in a parallel connection. When a positive type connection is connected to a negative connection, or vice versa, it results in a series connection. One having skill in the art should appreciate that a higher voltage may be achieved by increasing the number of series connection and a higher current may be achieved by increasing the number of parallel connections. Moreover, the productivity of the solar panels 110 may depend on the number or density of incident photons on the photoactive layer. As a photon hits a photoactive material unit or layer of a solar panel 110, the energy of the photon is absorbed or used by the material to excite and delocate an electron; the delocation of the electron(s) thus creates a flow of electrical energy. As this process repeats, a flow of many electrons create a flow of current (electrical energy) though a closed circuit. Therefore, the electrical energy, or current, generated may be harnessed into electricity. Each solar panel 110 may also include a converter, solar inverter, PV inverter, or the like, for converting the DC current output by the photovoltaic cells, as described above, into AC current for certain applications. This converter may also be included in the charge controller 130, described below, rather than in the solar panel 110.

In one embodiment of the scalable solar module array 100, a charge controller 130 may be included. The charge controller 130 can be used to regulate the DC current produced by one or more solar panels 110. The charge controller 130 may be physically coupled to a solar panel 110 (e.g. mechanical communication between the charge controller 130 and the back side of the solar panel 110). In other words, the charge controller 130 may be coupled directly to the back side of the solar panel 110. For example, the charge controller 130, or its outer surface or outer housing, may be adhered to the solar panel 110 while allowing/permitting an electrical connection between the solar panel 110 and the charge controller 130. However, the structure of the charge controller 130 may have a thin cross-section to avoid complicating (e.g. restricting the folds) the folding process of the solar panel 110. The foldability of the solar panels is explained further below. The charge controller 130 may also be electrically coupled to the solar panel 110. The charge controller 130 may be electrically coupled to the solar panel 110 by various methods, for example, by employing resilient conducting pins from the charge controller 130 which may contact conductive tracks on the solar panel 110 or by employing conductive prongs soldered to a complimentary receptacle in the solar panel 110. One having skill in the art should appreciate that such an arrangement may be reversed. Alternatively, the charge controller 130 may also be coupled to the solar panel 110 via a cable conductor, avoiding direct contact with the solar panel 110, and may be detached prior to folding the solar panel 110.

Furthermore, embodiments of the charge controller 130 may be connected to positive and negative poles of the solar panel 110 connector or grid, thus becoming a part of the closed circuit though which the migrating electrons can flow. The charge controller 130 may serve various functions including current regulation, checking back flow of current/electrical energy, preventing overcharging or over-discharging of a battery, such as a battery unit 140, and protecting the closed circuit from destructive surges in current. One having skill in the art should appreciate that charge controller 130 may be one or more diodes, transistors, integrated circuits, chips, relays or a combination thereof. Moreover, charge controller 130 may operate by regulating current flow by comparing it to a predetermined set value or values or range of current. For example, a simple diode based charge controller 130 can prevent the flow of current from a battery unit 140 to the solar panel 110 while allowing current to flow from the solar panel 110 (and potentially a second solar panel 110) to a battery unit 140 or electronic device 150. Alternatively, a transistor based charge controller 130 can allow a certain level of current flow and would act as a switch if a current falls outside a predetermined set range. The charge controller 130 may also be an electromechanical device, such as a relay to switch the circuit on or off, depending on a certain set value.

There may be one or more charge controllers 130 included in the scalable solar module array 100. For example, each module or each solar panel 110 may have its own charge controller 130. In other embodiments, there may be a single module designated as the module which outputs electrical energy and this module may be the only module which includes a charge controller 130. In yet another embodiment, the charge controller 130 may be detachable such that it can be attached to any single module, thereby designating that module as the module which outputs electrical energy to an electronic device 150. The designated module should be understood to mean the module which an electronic device 150 is attached to. Thus, all the electrical energy produced by the scalable solar module array 100 will be sent to this module via the cables 125 and thereby outputted, transferred, or sent to an electronic device 150.

Embodiments of the solar panels 110 may also include a receptacle 120. Each solar panel 110 may include a plurality of receptacles 120. The receptacle 120 may be coupled to or configured to accept or mate with a cable, cord, or other means which may support the flow or transfer of electrical energy (e.g., current). The receptacle 120 may be a socket, receptacle, jack, USB port (such as type-A, type-B, or type-C USB), mini-USB port, micro-USB port, lightning USB port or other electrical connection device that may accept electrical pins or contacts from an electrical plug or cord. For example, the receptacle 120 may be configured to accept or mate with a cable 125. The cable 125 is a cable or cord which supports the flow or transfer of electrical energy. For example, the cable 125 may be a wire, a cable, a cord, a USB cord, a lightning cable or other cables capable of supporting the flow of electricity. The cable 125 may be flexible, bendable, stretchable, or otherwise capable of being manipulated into different shapes or orientations. The cable 125 may include attachment means for mating with the receptacle 120 on one or each end of the cable 125. The attachment means may be a plug, a USB connector, a socket, a jack or other electrical connection means which may allow for the cable 125 to mate or attach to the receptacle 120. The term USB connector refers generally to all types of USB connectors (type-A, type-B, type-C, mini, micro, lightning etc.) and should not be understood to be limiting to any specific type of USB connector. As such, the cable 125 may be easily plugged in and unplugged to create the electrical connection between modules and the solar panels 110. As such, the cables 125 are detachable, removable, temporary, or otherwise capable of being removed from the receptacle 120.

Each solar panel 110 of the scalable solar module array 100 may include a plurality of receptacles 120. For example, each solar panel 110 may have one or more receptacles on each side of the solar panel 110. In other embodiments, one or more sides of each solar panel may not have a receptacle 120. Further, in other embodiments, the solar panels 110 of the scalable solar module array 100 may each have a different number of receptacles 120. Moreover, in some embodiments, each solar panel may have different types of receptacles 120. For example, one solar panel 110 may have 4 receptacles 120. Two of the receptacles may be USB ports, one receptacle may be a mini-USB port, and one receptacle may be a lightning USB port. The types of receptacles may vary based on the types of electronic devices 150 users intend to charge or power with the scalable solar module array 100.

The receptacle 120 may also include a clasp 121. The clasp 121 is a means for ensuring the attachment means of the cable 125 remains attached or mated to the receptacle 125. For example, the scalable solar module array 100 may be operated while a use is moving or traveling, particularly with high speed applications (i.e., where users are traveling at high speeds) such as bicycling, motorcycling, skiing, snowboarding, running, and the like. The movement may result in bumps, pulls, knocks, jerks, tugs, etc. which may dislodge or remove the attachment means of the cable 125 from the receptacle 120, thus disrupting the flow of electrical energy. The clasp 121 ensures that the attachment means remains attached or mated to the receptacle 120 until a user removes the clasp 121 and pulls out or removes the cable 125 from the receptacle 120. This ensures that the flow of electrical energy is not disrupted until a user intentionally removes the cable 125. Thus, the clasp 121 safeguards the flow of energy even when the scalable solar module array 100 is used in applications which would otherwise dislodge the cable 125.

The scalable solar module array 100 may be configured to provide electrical energy to an electronic device 150. An electronic device 150 may include a cell phone, a tablet, a laptop, a computer, a GPS, a handheld device, a flashlight, a radio, a communication device, a heating device, or any other device which is powered by electrical energy. Moreover, the electronic device 150 may be a battery or other device which stores electrical energy. The scalable solar module array 100 may charge or power an electronic device 150 directly or indirectly. Direct charging of an electronic device 150 may occur through electrical communication between a solar panel 110 and the electronic device 150. For instance, the electronic device 150 may plug into a receptacle 120 coupled to a solar panel via a charging cable 155 to receive electrical energy to charge the battery housed within an electronic device 150. The charging cable 155 may be the same cable as the cable 125. However, in other embodiments, the charging cable 155 may specific to the electronic device 150. For example, the charging cable 155 may have one end with the same attachment means as the cable 125, but the other end may have a different attachment means for attaching to the electronic device 150. In yet another embodiment, the charging cable 155 may not have any of the same attachment means as the cable 125 and the receptacle 120 which the charging cable 155 attaches to may also be a different type of receptacle from other receptacles included in the scalable solar module array 100. In other embodiments, the charging cable 155 may be a cable which is provided with the electronic device 150 and is separate from the scalable solar module array 100.

Indirect charging of an electronic device 150 may occur through the electrical communication between the scalable solar module array 100 and the electronic device 150. For instance, the electronic device 150 may plug into a receptacle coupled to a battery unit 140 to receive electrical energy to charge the battery housed within an electronic device 150. Moreover, the electronic device 150 may be charged or powered using wireless charging. For example, the electronic device 150 may be charged using radio charging, inductive charging, resonance charging, or the like.

The scalable solar module array 100 may include a plurality of modules. For example, as shown in FIG. 1, there is a first module 160, a second module 170, and a third module 180. A module comprises a solar panel 110 along with one or more receptacles 120 and corresponding clasps 121. Each module may convert light to electrical energy as described above. The modules may be connectable to each other through a cable 125. Thus, any number of modules may be included in the scalable solar module array 100. The modules may be electrically coupled, connected, or otherwise attached to one another such that electrical energy produced in one module can be transferred or sent to another module. As explained above, in some embodiments the modules may be electrically coupled together, but not physically coupled together (other than by a cable 125). In other embodiments, the modules may be both electrically and physically coupled together. For example, the modules may be coupled together with straps, bands, a housing, or other attachment means such that the modules are physically joined to one another.

Each module may be identical (i.e., have the same size solar panel 110 and contain the same number of receptacles 120). In other embodiments, the modules may have different size solar panels 110, contain a different number of receptacles 120, or have different types of receptacles 120. For example, a first module may have 4 identical receptacles, a second module may have 3 receptacles, 2 of which are identical to the receptacles and one receptacle which is different. As described above, different electronic devices may require different types of receptacles. As such, certain modules may be configured such that they are compatible with specific, popular or common electronic devices. For example, the type of receptacle used to connect one module to another may be standard, such that any one module can be connected to another. However, certain modules may be sold with one or more differing types of receptacles such that electronic devices which require a receptacle which is different than the standard receptacle described above can be used with the scalable solar module array 100.

As each module is connectable to one or more other modules, the electrical energy produced by each module may be combined, augmented, supplemented, pooled, added together, merged, or aggregated. Thus, the amount of electrical energy produced by the scalable solar module array 100 will depend, in part, on the number of modules being used. This allows for the scalable solar module array 100 to be scalable and customizable. For example, if more electrical energy is required for an application, users may simply connect one or more additional modules to the existing modules using one or more cables 125. If a user does not require the amount of electrical energy as the scalable solar module array 100 is configured to produce based on the number of modules present, one or more modules may be removed by simply unplugging a cable 125 and storing the removed module(s). In this way, users are not required to transport a unit larger than what is necessary for the desired application. Additionally, because modules are easily interchanged, if one module malfunctions, breaks, or otherwise fails, a new module can be installed or connected without difficulty to replace the failing module, without having to replace the entire scalable solar module array 100.

Each module may also be capable of providing its own electrical energy to an electronic device 150. For example, in one embodiment, the electrical energy produced by each module is not pooled. Rather, each module individually produces and outputs the electrical energy produced by the module. This allows for multiple electronic devices 150 to be charged or connected at the same time. For example, in an embodiment having three modules, a first electronic device 150 may be connected to the first module, a second electronic device 150 may be connected to the second module, and a third electronic 150 device may be connected to the third module. The electronic devices 150 may be different types of devices. For example, the first electronic device 150 may be a cell phone, the second electronic device may be a laptop, and the third electronic device may be a GPS. Moreover, in other embodiments, where a scalable solar module array 100 has multiple modules and one of the modules does not have an electronic device 150 plugged into it, the electrical energy produced by the module which is not charging an electronic device 150 may transfer the electrical energy it produces to the remaining modules which are charging electronic devices. For example, in an embodiment where there are again three modules, a first electronic device 150 is plugged into the first module and a second electronic device 150 is plugged into the second module, but no electronic device 150 is plugged into the third module. In this embodiment, the electrical energy produced by the third module may be stored in a battery unit 140 or may be transferred to the first and second modules as described above, thereby increasing the amount of electrical energy the first and second modules are able to output. When an electronic device 150 is plugged into the third module, the third module may stop transferring the electrical energy it produces to the first and second module and may instead begin to charge the electronic device 150.

Moreover, additional modules may be easily stored and can be accessible should a user require additional electrical energy. Each module has a thin cross-section. For example, each module may be less than 0.25 inches thick in some embodiments or less than 0.1 inches thick in other embodiments. As such, the modules can be stacked on top of one another without taking up additional storage space. For example, the additional modules can be placed in a bag, in a backpack, in a trunk of a vehicle, in a cart, or in any other suitable storage space such that the additional modules are readily available to users. This is particularly useful while traveling. Users may place the additional modules in a backpack, bag, or other storage container as they do not take up a large area. If the user is in a situation in which they require electrical energy, they can simply take one or more modules out, connect them using cables 125, and can immediately begin producing additional electrical energy.

The modularity of the scalable solar module array 100 also allows the unit to be set up in different shapes, based on the application. For example, in some application setting up all of the modules in a straight line may be desirable. However, in other applications, this may not be desirable or feasible. For example, where there is limited space to lay out the modules or where there is limited access to sunlight (i.e., if the modules were laid out in a straight line all modules would not have access to sunlight) an arrangement of the modules in a straight line may be impractical or impossible. In these applications, it may be desirable to connect a first module to the left side of a second module and then to connect a third module to the bottom of the second module, creating an "L" shape, for example, making the area on which the scalable solar module array 100 more compact, rather than spread out in a straight line. Any number of shapes or orientations can be accomplished, depending on the number of modules being used. As such, the scalable solar module array 100 can be customized to any application and can address and overcome space, access, light restriction or other restrictions, limitations, or boundaries which may be present. Moreover, because the cables 125 may be flexible, the modules are not limited to being arranged in straight lines or 90-degree angles. The cables 125 may be flexed such that adjacent modules may be placed at any angle relative to the module it is connected to. The orientation or angle of the modules with respect to adjacent modules is only limited by the length of the cable 125 connecting the modules. As the cables 125 can be any length, the number of potential set-ups, orientations, or alignments of the scalable solar module array 100 are abundant. Thus, the scalable solar module array 100 can be scaled and customized to nearly any application or situation which may be encountered.

Additionally, the solar panels 110 may be foldable further adding to the adaptability and to the ease of storage of the modules and the scalable solar module array 100. For example, a solar panel 110 may include a plurality of sectors. The plurality of sectors may each be a portion, a predetermined portion, a subdivided portion, and the like, of the solar panel 110, and may be divided, subdivided, separated, etc., by the transversal hinge and the longitudinal hinge. For instance, the solar panel 110 may include four sectors divided by the transversal hinge and longitudinal hinge, wherein each sector may be referred to as a quadrant. Other embodiments of the solar panel 110 may include less than four sectors, or more than four sectors, depending on the size of the solar panel 110, the foldable arrangement of the solar panel 110, and/or thickness of the solar panel 110. Increasing or decreasing the number of sectors may require additional hinges or an elimination of a hinge(s) to achieve the necessary separation and/or folding of the sectors. For example, the solar panel 110 may include only two sectors and one or more longitudinal hinge. The solar panel 110 may then be folded in half such that the two sectors face on another. The transversal hinge and the longitudinal hinge separating the plurality of sectors may be a hinge, pivot, joint, or similar mechanical device, that may allow each sector of the solar panel 110 to pivot, fold, etc., over the transversal hinge and/or over the longitudinal hinge. In other words, if the solar panel 110 includes four sectors, (e.g. four quadrants), the sector in the first quadrant (i.e. upper left) may be folded over the transversal hinge onto the sector in the fourth quadrant (i.e. lower left). In this way, when a first sector of the solar panel 110 is folded, the first sector faces a second sector of the panel. Because the sector in the first quadrant is not mechanically coupled, through hinged means or otherwise, to the sector in the second quadrant, (i.e. upper right), movement of the sector in the first quadrant over the transversal hinge may not be hindered or prevented. However, to prevent the sector in the first quadrant from collapsing when the solar panel 110 is in the collection or fully deployed position, a latching means may be used to removably secure the sector in the first quadrant to the sector in the second quadrant. Those having ordinary skill in the art should appreciate that the manner in which the solar panel 110 is foldable may vary in the folding order of the sectors, the mechanical means to achieve the necessary pivots, fold, etc., and the manner in which the solar panel 110 is mechanically secured in the deployed position and in the fully folded position.

Figure 2:
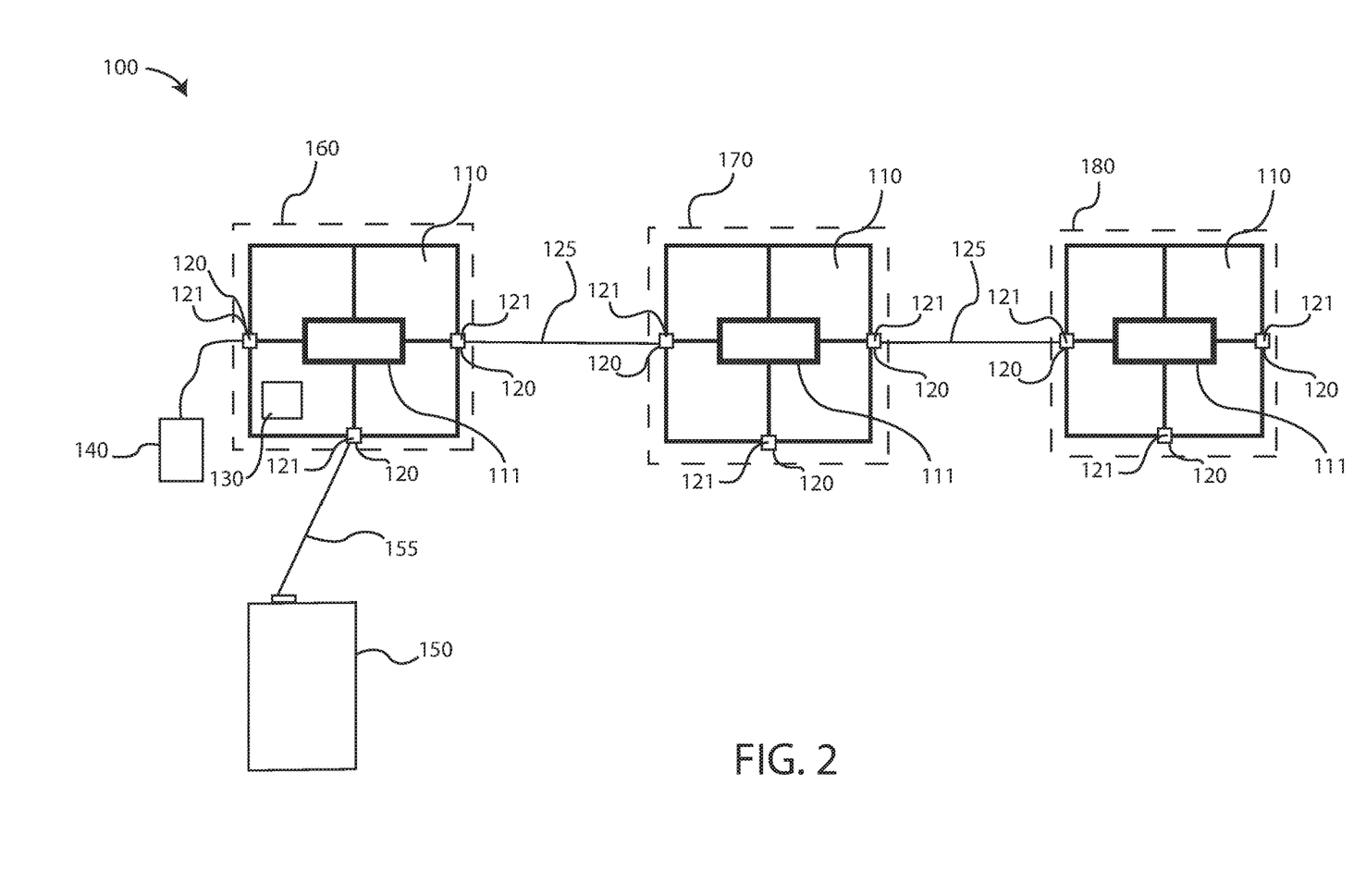
FIG. 2 depicts a rear view of an embodiment of a scalable solar module array.

Referring now to FIG. 2, a rear view of an embodiment of a scalable solar module array 100 is depicted. The rear view depicts a similar embodiment to the one shown in FIG. 1. It includes solar panels 110, receptacles 120, clasps 121, cables 125, charging cable 155, electronic device 150, and modules 160, 170, and 180. FIG. 2 depicts the back of the solar panels 110, from which the photovoltaic cells discussed above may not be visible. The back side of the solar panels 110 are not intended to receive light.

The back side of the solar panels 110 may include a mounting member 111. The mounting member 111 is a means for attaching or mounting each module to a surface or substrate. The mounting member 111 may be a strap, a bracket, a hook-and-loop fastener, a suction cup, a belt, a clip, a hook, adhesive, or any other suitable mounting member for attaching a module to a surface. In one embodiment, the back of each solar panel 110 includes a mounting member 111. In other embodiments, less than all of the solar panels 110 include a mounting member 111.

As each module may include its own mounting member 111, each module may be mounted or attached to a different surface, while still being electrically coupled to one another. For example, module 160 may be attached to a first surface, module 170 may be attached to a second surface, and module 180 may be attached to a third surface. This allows for further customization and adaptability of the scalable solar module array 100. Each module may be mounted in different locations, at different heights, and/or at different angles. Moreover, the modules may be spaced apart at varying lengths depending on the application. For example, the cables 125 which connect each module may be varying lengths, allowing the modules to be spaced apart and placed based on the needs of users at the time the scalable solar module array 100 is utilized.

Figure 3:
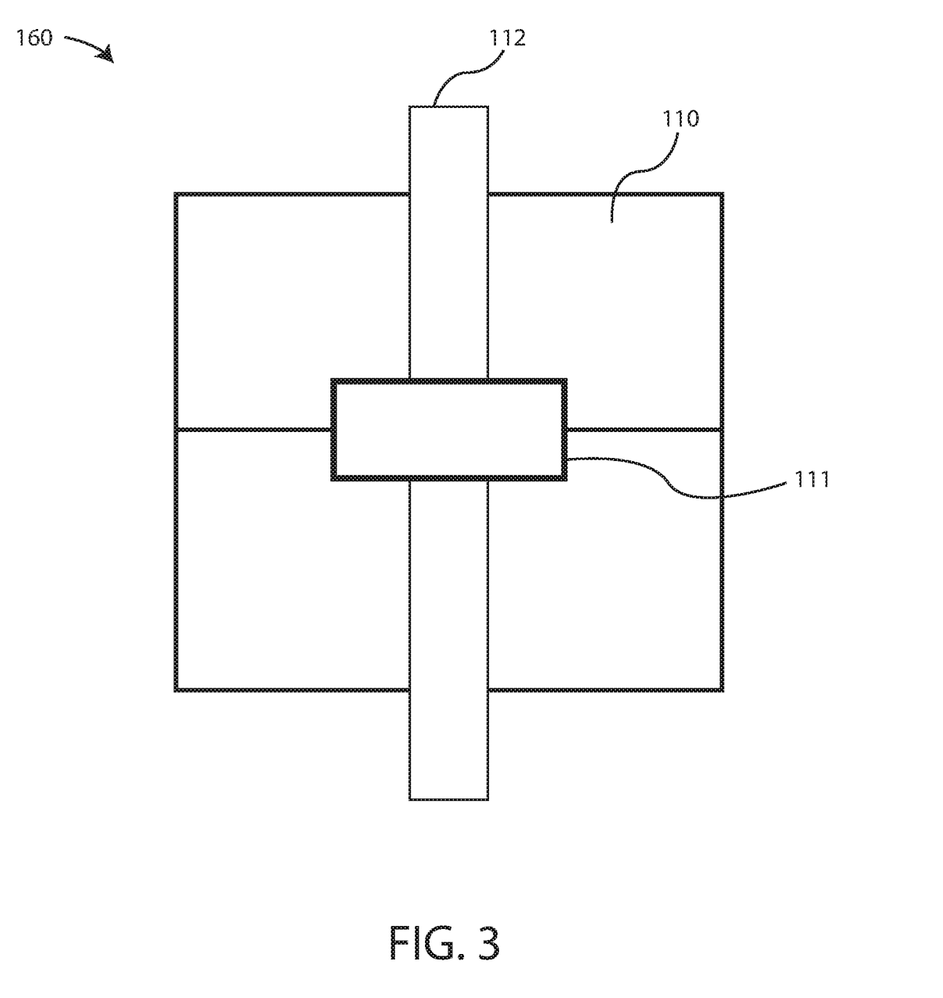
FIG. 3 depicts a rear view of an embodiment a solar array module.

Referring now to FIG. 3, a rear view of an embodiment a solar array module 160 is shown. The rear view of an embodiment a solar array module 160 shows a solar panel 110 along with a mounting member 111. From the drawings, a more detailed view of one embodiment of the mounting member 111 can be seen. This embodiment of the mounting member 111 shows a mounting having a gap or space which is placed on the back of the solar panel 110. The mounting member 111 should allow for space or gap between the mounting member 111 and the back of the solar panel 110. The space of gap should be large enough for a strap 112 to run between the mounting member 111 and the solar panel 110. The strap 112 may be a hook-and-loop fastener, webbing, attachment hardware (such as a bracket), and the like. The strap 112 may be run underneath the mounting member 111 and through a similar gap on the surface to which the module 160 is to be mounted to. For example, in one embodiment, the strap 112 is a strip of hook-and-loop fastener and the surface the module is to be mounted to is a backpack. The strap 112 can be placed through the mounting member 111 (hooking the strap to the module 160) and then the strap can be placed through a suitable gap on the backpack (such as through a backpack strap or arm). The strap 112 can then be secured by attached the hook-and-loop fastener to itself, securing the module 160 to the backpack. In embodiments where a hook-and-loop fastener is not used, a cinch, snap, tie, fastener, or other means for securing the strap 112 may be used. In applications where a stronger mounting member 111 is required, firm hardware attachments, such as a bracket, brace, or the like, secured by fasteners (such as screws or bolts) to the surface, may be used. In other embodiments, the mounting member 111 may not be necessary, such as where the scalable solar module array 100 is placed on a flat surface, for example.

Figure 4:
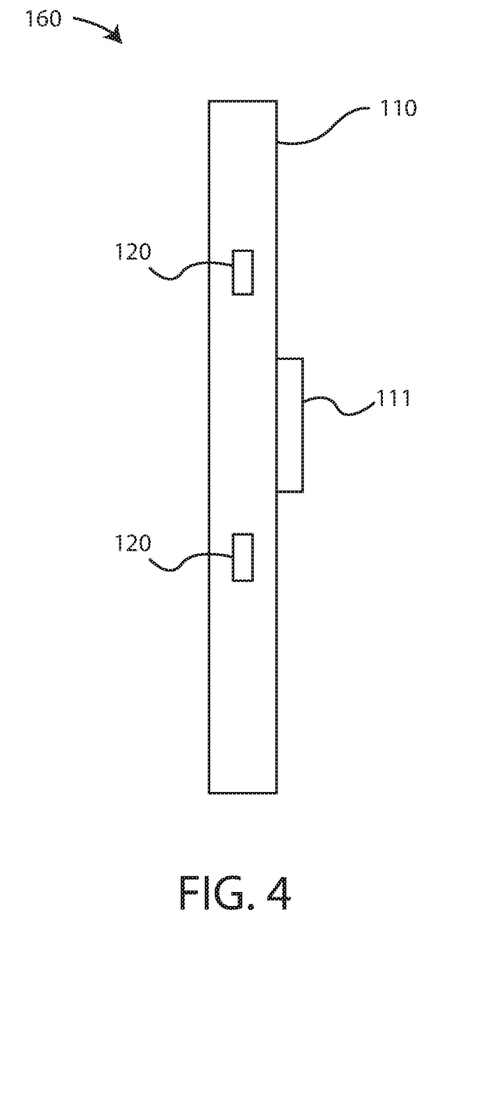
FIG. 4 depicts a side view of an embodiment of a solar array module.
Figure 5:
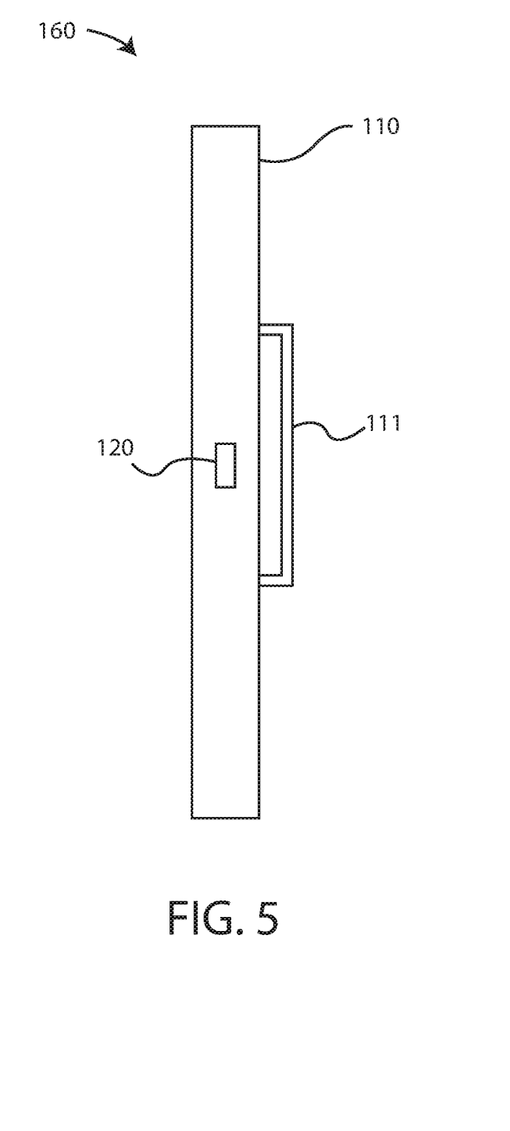
FIG. 5 depicts a bottom view of an embodiment of a solar array module.

FIGS. 4 and 5 depict a side and bottom view of an embodiment of a module 160, respectively. As described above, the module 160 may include a solar panel 110 and receptacles 120. Also shown in FIGS. 4 and 5 is the mounting member 111. As can be seen in FIG. 4, each side of a solar panel 110 may include one or more receptacles 120. The receptacles may be placed in the middle of the side of the solar panel 110 such that when a cable 125 is plugged into the receptacle 120 the solar panel 110 may still lie flat.

As shown in FIG. 5, the bottom of the solar panel 110 may also include a receptacle 120. In other embodiments, a plurality of receptacles 120 may be present on the bottom of the solar panel 110. Any number of receptacles 120 may be placed on the side and bottom of the solar panel 110. While not shown in the drawings, one or more receptacles may also be included on the top of the solar panel 110. In other embodiments, the top of the solar panel 110 may not include any receptacles 120.

In some embodiments, the scalable solar module array 100 may also include a battery unit 140. The battery unit 140 may refer to a housing enclosing a rechargeable battery, or may comprise a rechargeable battery, the outer surface being integral with the rechargeable battery. The battery unit 140 may comprise a rechargeable battery, or storage battery, that may include one or more electrochemical cells. For instance, the battery unit 140 may be a lead-acid battery, nickel-cadmium (NiCd), nickel metal hydride (NiMH), lithium-ion (Li-ion), lithium-ion polymer (Li-ion polymer), or other rechargeable battery known to those skilled in the art, having the ability to recharge, charge, and/or power an electronic device 150, such as a cellular phone, satellite phone, laptop, mp3 player, smartphone, GPS, and the like.

The structure of the battery unit 140, or outer housing of the battery unit 140, may vary, but should be sized and configured to withstand the load of the modules, while also withstanding cross winds or other lateral forces that may be exerted onto the battery unit 140. Further embodiments of the structure of the battery unit 140 may include ergonomic grips and/or surface features that may facilitate the gripping of the battery unit 140. For instance, the outer surface of the battery unit 140 may include recessions or grooves that correspond to shape of a clenched hand or may include a knurled surface to facilitate the gripping of the battery unit 140. Alternatively, a sleeve may be placed over a portion of the battery unit 140 to facilitate the gripping of the battery unit 140 in the field. The sleeve may surround or substantially surround a middle portion (i.e. a portion between the top end and the bottom end) of the battery unit 140.

A battery plug may be located on the outer surface of the battery unit 140, or protrude from the internals of the battery unit 140, proximate or otherwise near the top end. The battery plug may be in electrical communication with the battery unit 140, and may be any type of plug known to those skilled in the art, including two pin/contact plugs, three pin/contact plugs, USB, or other multi-conductor plugs. Moreover, the battery plug may be a plurality of electrical pins or electrical contacts (e.g. male contacts) configured to mate with the receptacle 120 of the solar panel 110 to establish an electrical connection. Specifically, the mating of the battery plug and the receptacle 120 may charge the battery unit 140. For example, the electrical energy converted/produced by the solar panels 110 from solar radiation may be transferred from the charge controller 130 through the receptacle 120, and upon mating with the battery plug, the electrical energy from the solar radiation may charge the battery unit 140.

In further embodiments, the battery unit 140 may further include a second receptacle located on the outer surface of the battery unit 140 (i.e. externally), or located inside the battery unit 140 (i.e. internally) wherein the electrical pins/contacts of a plug (such as charging cable 155) from an electronic device 150 may be inserted, proximate or otherwise near the top end of the battery unit 140. The second receptacle may be a socket, receptacle, jack, a USB, or other electrical connection device that may accept electrical pins or contacts from an electrical plug, such as the charging cable 155 of an electronic device 150 The second receptacle may be in electrical communication with the battery unit 140. Moreover, the second receptacle may be configured to accept or electrically mate with a plurality of electrical pins or electrical contacts of the charging cable 155 of an electronic device 150 to establish an electrical connection. The mating of the second receptacle and the charging cable 155 of an electronic device 150 may charge the electronic device 150. For example, the electrical energy stored in the battery unit 140 received from the modules through conversion of solar radiation by the solar panels 110, may be transferred from the battery unit 140 to the electronic device 150 through the mating of the second receptacle and the charging cable 155 of the electronic device 150.

Furthermore, an electronic device 150 may be powered, charged, and/or recharged while the first receptacle is mated with the battery plug. The charging cable 155 of an electronic device 150 may be plugged into the second receptacle while the first receptacle is mated with the battery plug. This allows the electronic device 150 to be powered from the stored energy of the battery unit 140, while additional electrical energy is being transferred from the modules to the battery unit 140. Alternatively, the electronic device 150 may be directly connected to the receptacles 120 to charge, power, and/or recharge the electronic device 150 in instances where the battery unit 140 does not have sufficient stored energy, or where the stored energy in the battery unit 140 should be saved for later consumption. For instance, the charging cable 155 of the electronic device 150 may be plugged into the receptacle 120 to receive electrical energy. In other embodiments, no battery unit 140 may be included with the scalable solar module array 100 and the electronic device may only be charged by plugging the charging cable 155 into a receptacle 120.

Figure 6:
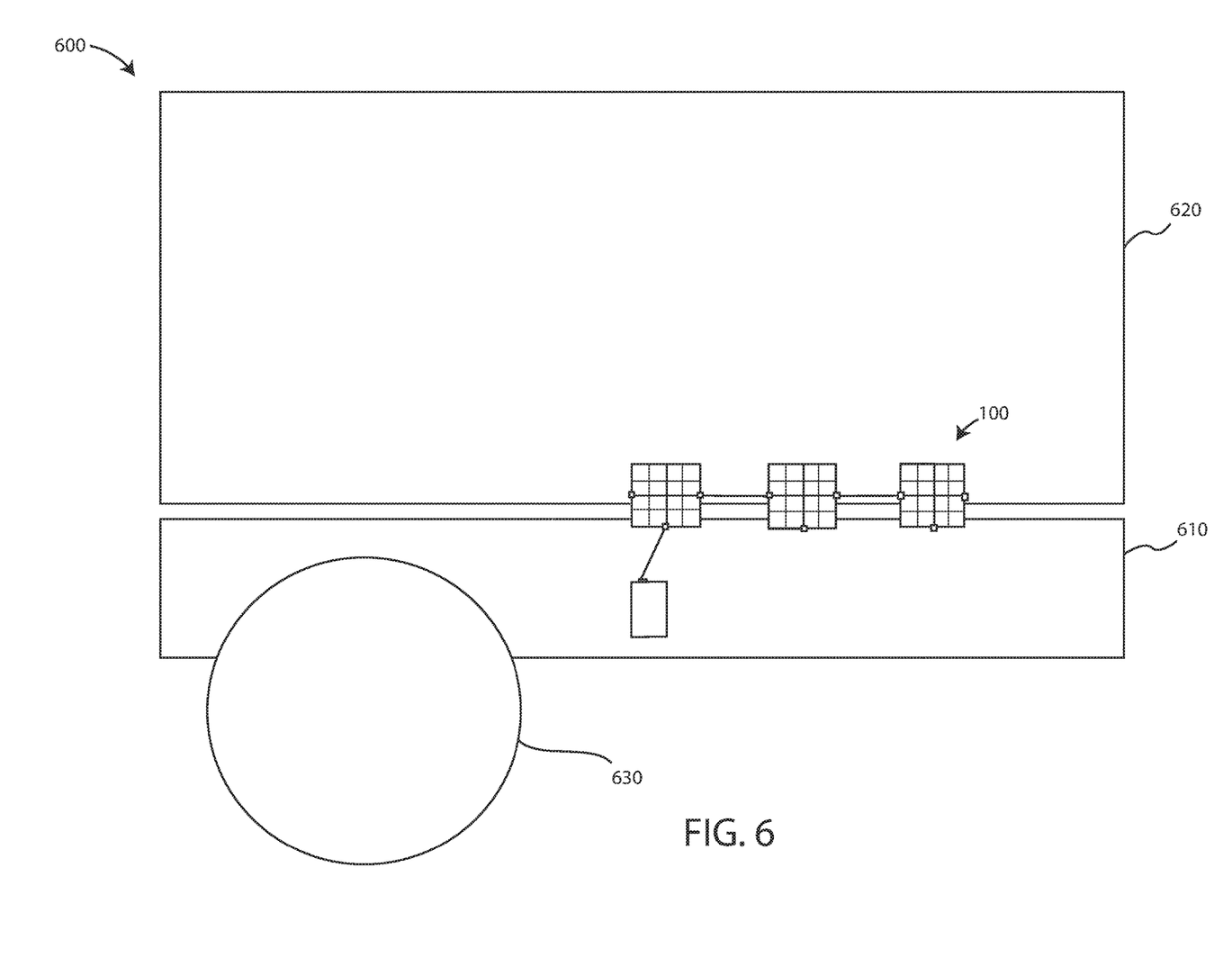
FIG. 6 depicts an embodiment of a scalable solar module array in a first environment.

FIG. 6 depicts an embodiment of a scalable solar module array 100 in a first environment 600. The first environment 600 may be described or referred to as an automotive environment, a vehicle environment, or the like. The first environment 600 may be inside of a car, truck, bus, or any other type of vehicle. As shown in FIG. 6, the first environment 600 includes a scalable solar module array 100, a dashboard 610, a window 620, and a steering wheel 630. The scalable solar module array 100 may sit on the dashboard such that light which passes through the window 620 hits the solar panels 110 in the scalable solar module array 100. As such, the scalable solar module array 100 will be configured to produce electrical energy while the vehicle is stationary or in motion. The scalable solar module array 100 is placed in a manner which would not obstruct or intrude on the vision of a driver of the vehicle. Due to the thin cross-section of the scalable solar module array 100, it can be placed on the dashboard 610 without being in the field of vision or obstructing the view of the driver.

The mounting member 111 may or may not be used in connection with the first environment 600. For example, because there may be nothing to strap on to, the mounting member 111 as described above with respect to FIG. 3 may not be appropriate. Moreover, because the scalable solar module array 100 is simply sitting on the dashboard 610, there may be no need for a mounting member 111 because there are no forces present which would cause the scalable solar module array 100 to be moved or dislodged from its position. In other embodiments, a mounting member 111 such as an adhesive, a suction cup, a hook-and-loop fastener (where the hooks are mounted to the scalable solar module array 100 and the loops are mounted to the dashboard 610 or vice-versa), or the like may be used to secure the scalable solar module array 100 to the dashboard 610. In other embodiments, the scalable solar module array 100 may be mounted to other parts of the first environment 600, such as to a side window (not shown) or placed near the rear window of the vehicle in a similar manner as described above. Moreover, the scalable solar module array 100 can be used in the manner described above near any window which has light passing through and is not limited to applications within a vehicle.

The scalable solar module array 100 in the first environment 600 can be used to charge or power an electronic device 150 as described above. This is particularly useful when users become stranded due to a vehicle failing or breaking down. It is also beneficial for longer trips in a vehicle where users must go without access to a sustainable electricity source for extended periods of time. The electronic device 150 may be a cell phone, a radio, a navigation device (such as a GPS), a communication device, an electric heater or air conditioner, an electric portable refrigerator, or any other device which is powered by electrical energy.

In one embodiment, the scalable solar module array 100 may be used to power or charge a portable vehicle jump starter. In this embodiment, if a vehicle's battery dies and there are no other vehicles or electricity sources in the area, the vehicle may be stranded for an indeterminant amount of time. However, users may utilize the scalable solar module array 100 to charge a portable vehicle jump starter which can be used to charge the battery of the vehicle such that the vehicle can be started without the need for an outside electricity source or another vehicle to jump start the battery. In another embodiment, the scalable solar module array 100 may be used to charge or power the glowplug of a diesel engine. In colder weather, some high-speed diesel engines can be difficult to start. A glowplug is used as a heating element when the diesel engine is not in use to ensure that the fuel is at a sufficient temperature to start the diesel engine. However, where a user driving a vehicle powered by a diesel engine in cold weather is forced to stop in a location without access to electricity, the user may be unable to start the diesel engine once it has cooled down. In this embodiment, the scalable solar module array 100 can be used to provide electrical energy to the glowplug such that the diesel engine can be started again, and the user is not stranded.

In another embodiment, the scalable solar module array 100 can be used to power, charge or supplement the power for a navigational system of a vehicle. The vehicle may be a standard vehicle, a self-driving vehicle, a robotic vehicle, an autonomous vehicle, or the like which relies on a navigational system for direction. For example, a self-driving or robotic vehicle may rely on a mapping system which utilizes navigational nodes and beacons for creating paths for the vehicle to travel along. The vehicle includes sensors and systems which sense the nodes and beacons for creating interconnecting paths for the vehicle to travel along. In other words, the system of navigational nodes and beacons provide effective navigation capability for the vehicle by directing the vehicles from one node to another. The navigational nodes and beacons may be digital, such as programmed into a mapping platform, or physical. The navigational nodes and beacons may communicate with one another and with systems of the vehicle. In this embodiment, the scalable solar module array 100 can be placed on the vehicle itself to power or supplemental the electrical energy being supplied to the vehicles navigational and other systems. The scalable solar module array 100 can also be placed and/or mounted on the navigational nodes and beacons themselves such that the power to the navigational nodes and beacons is not disrupted.

Figure 7:
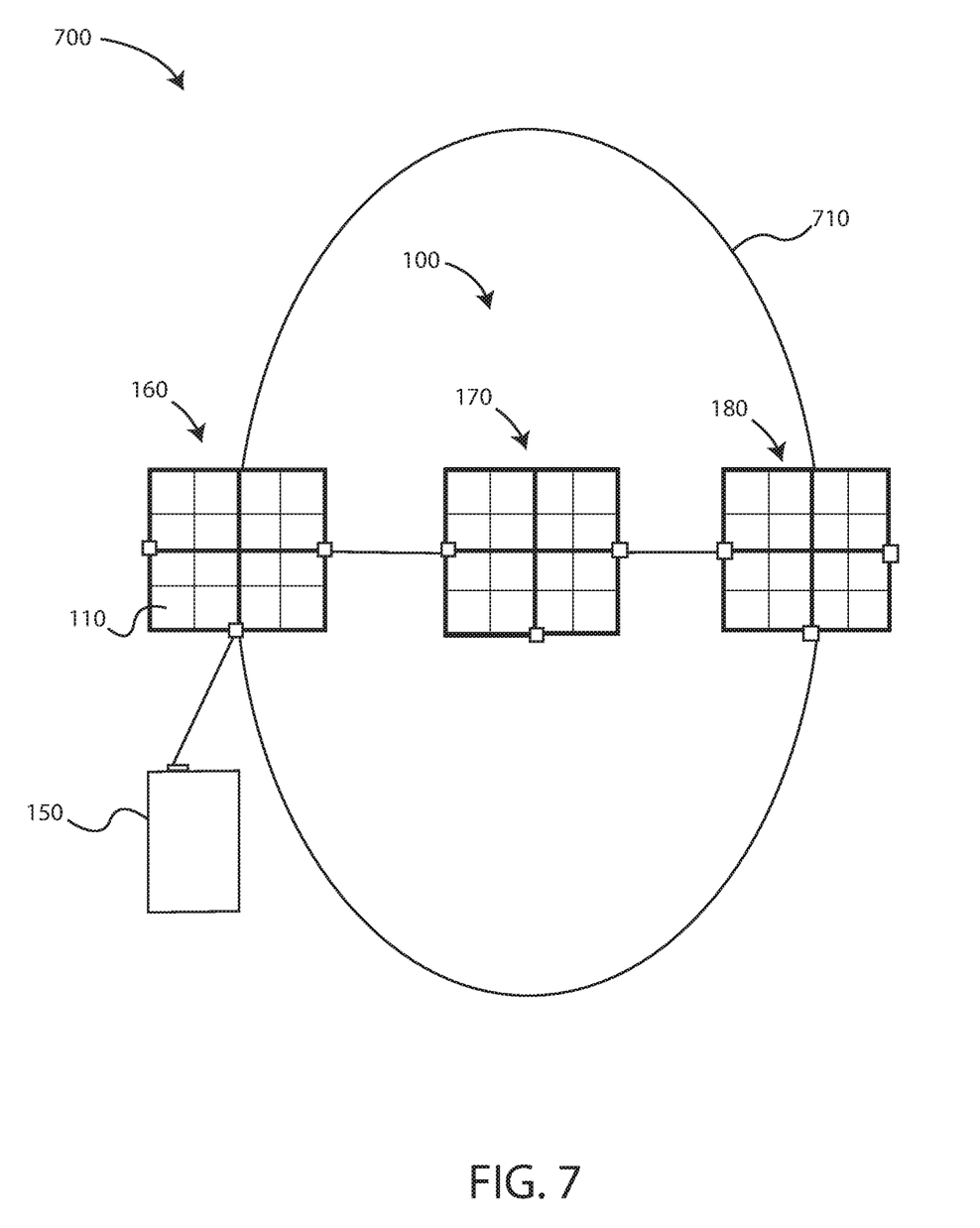
FIG. 7 depicts an embodiment of a scalable solar module array in a second environment.

FIG. 7 depicts an embodiment of the scalable solar module array 100 in a second environment. The second environment can be described as a backpack, a bag, a pack, a rucksack, or any other surface or item which users may carry. The second environment 700 has a scalable solar module array 100, having 3 modules 160, 170, and 180 connected by cables 125, each having solar panels 110 and receptacles 120. The second environment 700 also includes a bag 710. The bag 710 may be a backpack, a bag, a pack, a rucksack, a basket, a tote, a duffle bag, or any other item users may carry. The bag 710 may include a strap 720. The strap 720 may be a strap, an arm, webbing, a handle, a pocket, a pouch, a belt, or the like. As described above, each module 160, 170, 180 have a mounting member 111 on the back side. The mounting member 111 of each module 160, 170, 180 can be mounted, attached, strapped, or the like to the strap 720. In this way, users may carry the bag 710 which the scalable solar module array 100 is mounted or attached to the bag 710. For example, while hiking users may attach the scalable solar module array 100 to the back of a backpack. While walking, the scalable solar module array 100 can charge or power an electronic device 150, such as a cell phone, radio, navigational device, electric heater, or the like. Thus, if the user becomes lost or stranded, the electronic device 150 will be fully charged and ready for use. The electronic device 150 can be stored in a pocket, strap, compartment, or otherwise on the bag 710, carried by a user, or (due to the clasp 121), may be simply hanging from the scalable solar module array 100. Moreover, mounting the scalable solar module array 100 in this way allows users to easily transport the scalable solar module array 100 without the array taking up space within a bag 710. Additional solar modules may be stored within the bag as they do not take up significant space, as described above, if additional electrical power is required.

Figure 8:
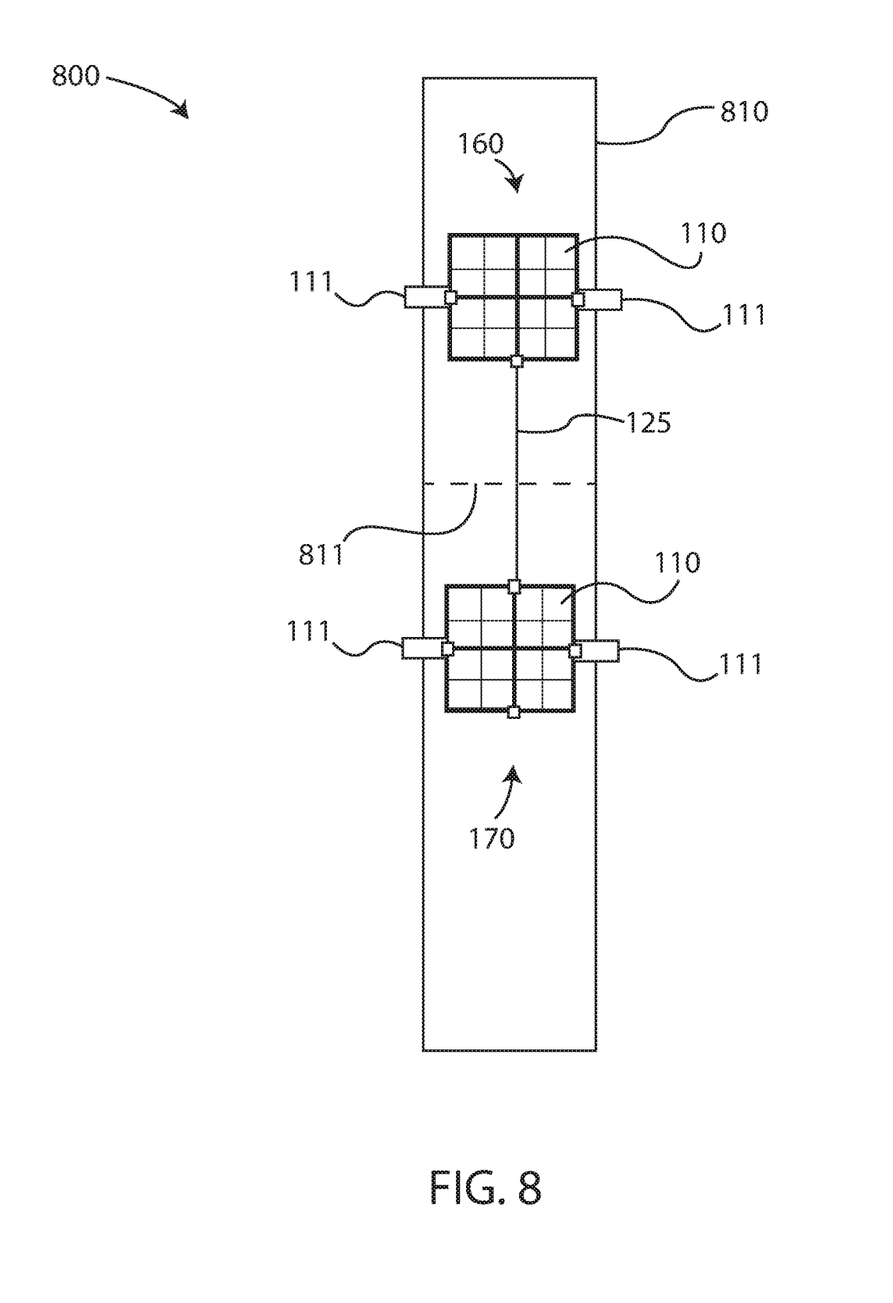
FIG. 8 depicts an embodiment of a scalable solar module array in a third environment.

FIG. 8 depicts an embodiment of the scalable solar module array 100 in a third environment 800. The third environment 800 can be described as a wearable environment. The third environment 800 includes a limb 810. The limb 810 may be an arm, a leg, a hand, a forearm, or any other limb of a human. The limb 810 may have a joint 811. The joint 811 may be an elbow, a wrist, a knee, or any other joint on the human body. The environment 800 also includes a scalable solar module array 100 having two modules, 160 and 170. Each module 160, 170 has a solar panel 110, a mounting member 111, and receptacles 120. The modules 160, 170 are connected via a cable 125. The scalable solar module array 100 may also include one or more charging cables 155 for charging or powering an electronic device 150 (not shown).

In the embodiment depicted in FIG. 8, the mounting member 111 may be a strap, hook-and-loop fasteners, a band, or the like for wrapping around the limb 810. For example, the mounting member 111 may be a hook-and-loop fastener wherein users wrap the mounting member 111 around their limb 810 and snugly attaches the hook-and-loop fastener to itself such that the solar module is mounted or attached to the limb 810. In other embodiments, a snap fastener, a button, a cinch, a buckle, or any other fastening means for ensuring that the module can be tightly attached to the limb 810. In one embodiment, the module 160 and the module 170 may be on opposite sides of the joint 811. This allows the joint 811 to be bent and not obstructed, while still allowing the limb 810 to support multiple solar modules.

For example, users may desire to charge or power an electronic device while walking, hiking, jogging, running, or otherwise traveling. However, traditional portable solar panels would either be too large to attach to a limb of the user (or would otherwise obstruct a limb of the user), would be so small that that would not produce sufficient electrical energy and do not have a proper means for mounting or attaching the solar panels to a limb of the user. As described above, multiple modules can be mounted or attached to the limb 810 of a user due to the modularity of the scalable solar module array 100. As the modules can be placed spread apart, such as on both sides of a joint 811, multiple modules can be worn or carried by a user on their limbs while retaining full mobility and range of motion of the limbs. As the cable 125 may be a flexible cable, as the joint 811 is bent, the cable 125 can be flexed along with the joint such that the cable is not detached or unplugged from the receptacle 120.

As will be understood by one having ordinary skill in the art, the scalable solar module array 100 may be used in the manner described above in any number of applications. For example, the scalable solar module array 100 can be strapped to a user, a bag, or otherwise while the user is biking or driving a motorcycle. The scalable solar module array 100 can be used in snowboarding, skiing, or cross-country skiing applications where users would be particularly susceptible to danger should they become stranded due to the cold.

In some embodiments, the scalable solar module array 100 may utilize circuits, devices, methods, or techniques to prevent switching losses. Switching loss is the heat generated in the time it takes for a transistor to go from on to off or vice-versa. Switching losses occur during each turn-on and turn-off in pulse-width-modulated (PWM) power supplies or converters. For example, switching loss may occur within the charge controller 130. Switching losses occur due to the simultaneous coexistence of significant voltage and current at switch terminals during the switching phase (turn-on or turn-off). Losses occur because the switch (generally a transistor) behaves in a linear manner during this phase; these losses may represent a non-negligible part of the total losses in the switch (of a similar order to conduction losses, for example) when the switching frequency is high. In embodiments of the scalable solar module array 100 which utilize a PWM converter, these losses may be undesirable. As such, to reduce these losses, the scalable solar module array 100 may utilize resonant circuits. In one embodiment, zero-voltage switching (ZVS) or zero-current switching (ZCS) may be utilized wherein the voltage or current across the switch is brought to zero before the switch is turned on. These techniques utilize an LC resonant circuit around the switches. Depending on the location of the resonant circuit elements ZVS or ZCS, turn-on or turn-off transitions can be created. Typically, in ZCS converters, a resonant inductor, which is placed in series with the switch, is used to resonant the current through the switch to zero at turn-off and limit di/dt for turn-on. Typically, in ZVS converters, a resonance capacitor, which is placed in parallel with the switch, is used to resonant the voltage across the switch to zero at turn-on. These switching techniques and circuits may be utilized with a DC-DC converter included with the scalable solar module array 100. The switching techniques and circuits may be integrated within the solar panels 110, located outside of the solar panels 110, or may be included with the charge controller 130 described above.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, it should be understood that the present invention may include any combination of the components, hierarchy and methodology described herein.

The invention claimed is:

1. A scalable solar module array comprising:
    a first module electrically coupled to a second module, wherein the first and second module each include:
        a solar panel to collect solar radiation;
        one or more receptacles located on the solar panel, wherein at least one receptacle is located on a first side of the solar panel and at least one receptacle is located on a second side that is orthogonal to the first side, the one or more receptacles are configured to accept a charging cable for an electronic device; and
        a mounting member that moves with the solar panel as the first module or the second module is moved to arrange the scalable solar module array into a desired orientation;
    wherein the first module and second module are electrically coupled through a cable that is detachable and flexible to allow an electrical connection between the first module and the second module in the desired orientation, the cable being connected to a receptacle of the first module and a receptacle of the second module;
    wherein, when the cable is physically connected to the first module and the second module, the first module is movable with respect to the second module to adjust an angle between the first module and the second module, and as a function of a movability of the first module with respect to the second module, an orientation between the first module and the second module changes depending on a shape of a surface when the scalable solar array is placed into contact with the surface.

2. The scalable solar module array of claim 1, wherein the solar panel is foldable such that when a first sector of the solar panel is folded it faces a second sector of the solar panel.

3. The scalable solar module array of claim 1, further comprising a charge controller electrically and mechanically coupled to the solar panel, the charge controller regulating the flow of current from the solar panel.

4. The scalable solar module array of claim 3, further comprising a battery unit electrically coupled to the charge controller the battery unit having a receptacle configured to establish an electrical connection with the electronic device.

5. The scalable solar module array of claim 1, wherein the mounting member is a strap and a strip of hook-and-loop fastener such that the strip of hook-and-loop fastener wraps around the strap and a surface to which the first module or the second module is mounted.

6. The scalable solar module array of claim 1, wherein electronic device is at least one of a computing device, a navigational device, or a communication device.

7. The scalable solar module array of claim 1, wherein the first module is configured to accept a charging cable for a first electronic device and the second module is configured to accept a charging cable for a second electronic device.

8. The scalable solar module array of claim 1, wherein the surface of the environment is a dashboard of a vehicle such that solar radiation passes through a window of the vehicle and is collected by the solar panel of the first module and the second module.

9. The scalable solar module array of claim 1, wherein the surface is a human limb such that first module and the second module can be worn on the human limb.

10. A solar array configured to be arranged in a plurality of shapes, comprising:
   a first solar panel, the first solar panel having one or more photovoltaic cells on a first side and a mounting member on a second side, wherein the first solar panel includes a plurality of receptacles configured for establishing an electrical connection with an electronic device;
   a second solar panel, the second solar panel having one or more photovoltaic cells on a first side and a mounting member on a second side, wherein the second solar panel includes a plurality of receptacles configured for establishing an electrical connection with an electronic device;
   a flexible cable for supporting a flow of current and for allowing the first solar panel and the second solar panel to be electrically connected when the solar array is arranged into the plurality of shapes;
   wherein the flexible cable is plugged in to a receptacle on a first edge of the first solar panel and a receptacle of the second solar panel such that electrical energy produced by one solar panel can flow to the other solar panel such that the flow of current from the first and second solar panels is combined;
   wherein the electronic device is connectable to the solar array via a cable that plugs into a receptacle on a second edge of the first solar panel that is orthogonal to the first edge of the first solar panel;
   wherein, when the electronic device is connected to the solar array and the flexible cable is physically connected to the first solar panel and the second solar panel, the first solar panel is movable with respect to the second solar panel to adjust an angle between the first solar panel and the second solar panel, and as a function of a movability of the first solar panel with respect to the second solar panel, an orientation between the first solar panel and the second solar panel changes depending on a shape of a surface when the solar array is placed into contact with the surface.

11. The solar array of claim 10, wherein the first solar panel and the second solar panel are foldable.

12. The solar array of claim 10, wherein the electronic device is a navigation system of a vehicle.

13. The solar array of claim 10, wherein the mounting member is at least one of a strap, a bracket, a hook-and-loop fastener, a suction cup, a belt, a clip, or an adhesive.

14. The solar array of claim 10, further comprising a charge controller electrically and mechanically coupled to the first solar panel, the charge controller regulating the flow of current from the first and second solar panels.

15. The solar array of claim 14, further comprising a battery unit electrically coupled to the charge controller, the battery unit having a receptacle configured to establish an electrical connection with the electronic device.

16. The solar array of claim 10, wherein the first and second solar panels can be worn on a human limb using the mounting members.

17. A method of charging an electronic device comprising:
   connecting a first module having a first solar panel to a second module having a second solar panel using a flexible cable that is connectable to any one receptacle of a plurality of receptacles located on all sides of the first solar panel and the second solar panel to form a solar array;
   for a first application, arranging the solar array into a first desired orientation by moving the first module with respect to the second module; and
   for a second application different than the first application, arranging the solar array into a second desired orientation by moving the first module with respect to the second module, wherein, in both the first desired orientation and the second orientation, a shape of the solar array conforms to a surface when the solar array is placed onto the surface;
   wherein the solar array is configured to:
      collect solar radiation with the first solar panel and the second solar panel;
      transfer the flow of current from the second solar panel to the first solar panel using the flexible cable;
      combine the flow of current from the first solar panel and the second solar panel;
      regulating the flow of current from the first solar panel and the second solar panel through a charge controller; and
      transferring electrical energy produced by the first solar panel and the second solar panel to the electronic device which is electrically coupled to either the first solar panel or the second solar panel.

18. The method of claim 17, further comprising transferring electrical energy to a battery unit that is electrically coupled to the first solar panel.

19. The method of claim 17, further comprising:
   connecting a third solar panel to the first solar panel and the second solar panel to increase an electrical output of the solar array, using a second flexible cable.

20. The method of claim 17, wherein the solar array is further configured to transfer electrical energy produced by the first solar panel and the second solar panel to a second electronic device which is coupled to the second solar panel.

* * * * *